United States Patent
Grossman et al.

(10) Patent No.: US 6,844,086 B2
(45) Date of Patent: Jan. 18, 2005

(54) NICKEL-BASE SUPERALLOY ARTICLE SUBSTRATE HAVING ALUMINIDE COATING THEREON, AND ITS FABRICATION

(75) Inventors: Theodore Robert Grossman, Hamilton, OH (US); Ronald Gustav Rajala, Loveland, OH (US); Dwayne Edward Burnett, Liberty Township, OH (US); William Scott Walston, Mason, OH (US); Wendy Howard Murpjy, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 10/071,130

(22) Filed: Feb. 8, 2002

(65) Prior Publication Data

US 2003/0152799 A1 Aug. 14, 2003

(51) Int. Cl.⁷ ............... F03B 3/12; B23B 15/01; C23C 16/00
(52) U.S. Cl. ........ 428/680; 428/610; 428/650; 428/679; 428/332; 428/336; 416/241 R; 427/250; 427/252; 427/318; 427/319; 427/320; 427/419.1
(58) Field of Search ............... 428/469, 472, 428/610, 632, 650, 655, 621, 670, 679, 680, 332, 336; 416/241 R; 427/250, 252, 318, 319, 320, 419.1

(56) References Cited

U.S. PATENT DOCUMENTS

| | | | |
|---|---|---|---|
| 5,334,263 A | 8/1994 | Schaeffer | |
| 5,598,968 A | 2/1997 | Schaeffer et al. | |
| 5,935,353 A | 8/1999 | Murphy et al. | |
| 6,045,863 A | * 4/2000 | Olson et al. | |
| 6,066,405 A | 5/2000 | Schaeffer | |
| 6,332,926 B1 | 12/2001 | Pfaendtner et al. | |

* cited by examiner

Primary Examiner—Jennifer McNeil
(74) Attorney, Agent, or Firm—Gregory O. Garmong; Carmen Santa Maria; McNees Wallace & Nurick LLC

(57) ABSTRACT

A coated superalloy article is prepared by furnishing a nickel-base superalloy article substrate having a rhenium content of not less than about 4.0 percent by weight, and thereafter depositing an aluminum-containing coating onto a surface of the article substrate. The aluminum-containing coating includes an additive zone having an average aluminum content of not greater than about 27 percent by weight, and a diffusion zone of interdiffusion with the article substrate. A ratio of a thickness of the additive zone to a thickness of the diffusion zone is not greater than about 3:1, and is preferably about 1:1.

26 Claims, 2 Drawing Sheets

NICKEL-BASE SUPERALLOY ARTICLE SUBSTRATE HAVING ALUMINIDE COATING THEREON, AND ITS FABRICATION

This invention relates to the preparation of nickel-base superalloy substrate articles having aluminide coatings thereon, and more particularly to the fabrication of such substrate articles wherein the nickel-base superalloy is subject to the formation of a secondary reaction zone.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. The hot exhaust gases flow from the back of the engine, driving it and the aircraft forward.

Nickel-base superalloys are used in many of the highest-temperature materials applications in the aircraft gas turbine engine. For example, nickel-base superalloys are used to fabricate the high-pressure and low-pressure gas turbine blades. These turbine blades are subjected to extreme conditions of both stress and environmental conditions. The compositions of the nickel-base superalloys are engineered to carry the stresses imposed upon the blades. Protective coatings are typically applied to the gas turbine blades to protect them against environmental attack by the hot, corrosive combustion gases.

A widely used protective coating is an aluminum-containing coating termed a diffusion aluminide coating. An aluminum-containing layer is deposited upon the surface of the superalloy article. This aluminum-containing layer may include modifying elements such as platinum or palladium. During the deposition process and subsequently in service, the aluminum-containing layer interdiffuses with the substrate material and also oxidizes at its exposed surface to produce an aluminum oxide scale. After its initial formation, this aluminum oxide scale thickens only relatively slightly and remains highly adherent to the underlying material. The aluminum oxide scale thus protects the underlying aluminide coating and substrate against further oxidation and corrosion damage. Optionally, a ceramic thermal barrier coating may be applied overlying the aluminide coating and its aluminum oxide scale.

This approach to the formation of a protective coating is highly successful and widely used for many types of nickel-base superalloys. With other advanced superalloys, however, problems may arise. For example, rhenium is added to some nickel-base superalloys for improved mechanical properties. When such an enhanced-rhenium article is coated with an aluminide coating and then subjected to a sufficiently high temperature and long time at temperature, the aluminum of the coating chemically reacts with the rhenium and other constituents of the article substrate to form a secondary reaction zone (SRZ). The SRZ forms as acicular precipitates extending in a brittle layer inwardly into the article substrate for distances of up to about 0.010 inches, weakening the article substrate to that depth.

A substantial weakening of a depth of 0.010 inches of material may not be a concern in some applications. However, the gas turbine blades are usually hollow with typical wall thicknesses of 0.020–0.060 inches, or have other thickness dimensions within this range. A weakening of 0.010 inches of the depth of such a hollow gas turbine blade means that 15–50 percent of the wall thickness is weakened, greatly compromising the functionality of the turbine blade.

The problem of SRZ in aluminum-coated high-rhenium nickel-base superalloys has been recognized, and various techniques to avoid the formation of SRZ have been proposed. See, for example, U.S. Pat. Nos. 5,935,353; 5,334,263; and 5,598,968. These approaches are operable in many situations, but not in others.

There is accordingly a need for additional approaches for avoiding SRZ formation. The present invention fulfills this need in part, and further provides related advantages.

SUMMARY OF THE INVENTION

The present invention provides a method for preparing an article having a nickel-base superalloy article substrate with an aluminide coating thereon (including both simple and modified aluminides), and such an article. The nickel-base superalloy substrate is made of a material that is otherwise subject to the formation of a secondary reaction zone (SRZ), but very little, and preferably no, such SRZ is present in the present article. The present approach is operable even in conditions where other techniques for producing an SRZ-free article are not successful in avoiding the formation of SRZ.

A method for preparing a coated superalloy article comprises the step of furnishing a nickel-base superalloy article substrate having a rhenium content of not less than about 4.0 percent by weight, and thereafter depositing an aluminum-containing coating onto a surface of the article substrate. The aluminum-containing coating includes an additive zone having an average aluminum content of not greater than about 27 percent by weight, and a diffusion zone of interdiffusion with the article substrate. A ratio of a thickness of the additive zone to a thickness of the diffusion zone is not greater than about 3:1.

The nickel-base superalloy article is preferably made of the alloy René N6. The article substrate is desirably in the form of a component of a gas turbine engine, such as a gas turbine blade. The article substrate is preferably furnished in a stress relieved condition, and the step of depositing is performed without any intermediate cold working of the surface of the article substrate.

The step of depositing preferably is performed by a vapor-phase aluminiding process that includes heating the article substrate to a temperature of from about 1925° F. to about 2000° F. and depositing the aluminum from the vapor phase. The average aluminum content of the additive zone is less than about 27 weight percent, and preferably from about 22 to about 27 percent by weight. The ratio of the thickness of the additive zone to the thickness of the diffusion zone is less than about 3:1, and is preferably from about 0.75:1 to about 1.25:1. It is preferred, but not mandatory, that there is substantially no amount of a platinum-group element present in the aluminum-containing coating.

A coated superalloy article comprises a nickel-base superalloy article substrate having a rhenium content of not less than about 4.0 percent by weight, and an aluminum-containing coating at a surface of the article substrate. The aluminum-containing coating includes an additive zone having an average aluminum content of not greater than about 27 percent by weight, and a diffusion zone of interdiffusion with the article substrate. A ratio of a thickness of the additive zone to a thickness of the diffusion zone is not greater than about 3:1. Features and details described elsewhere herein may be used in relation to this article.

Contrary to the experience in other situations, it has been found that in some circumstances a thick additive zone having a high aluminum content can lead to the formation of SRZ, even in the absence of cold work at the surface of the article substrate at the time of the deposition of the aluminide coating. The present approach produces the diffusion aluminide coating without any SRZ, by reducing the aluminum content of the additive zone and making the diffusion zone relatively thinner. Nickel can therefore diffuse outwardly from the article substrate more readily to reach the additive zone, so that less aluminum diffuses inwardly to the interface between the diffusion zone and the base metal of the article substrate. As a result, there is a reduced tendency for interaction between the aluminum and the rhenium in the article substrate to cause the formation of SRZ after prolonged elevated temperature exposure.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
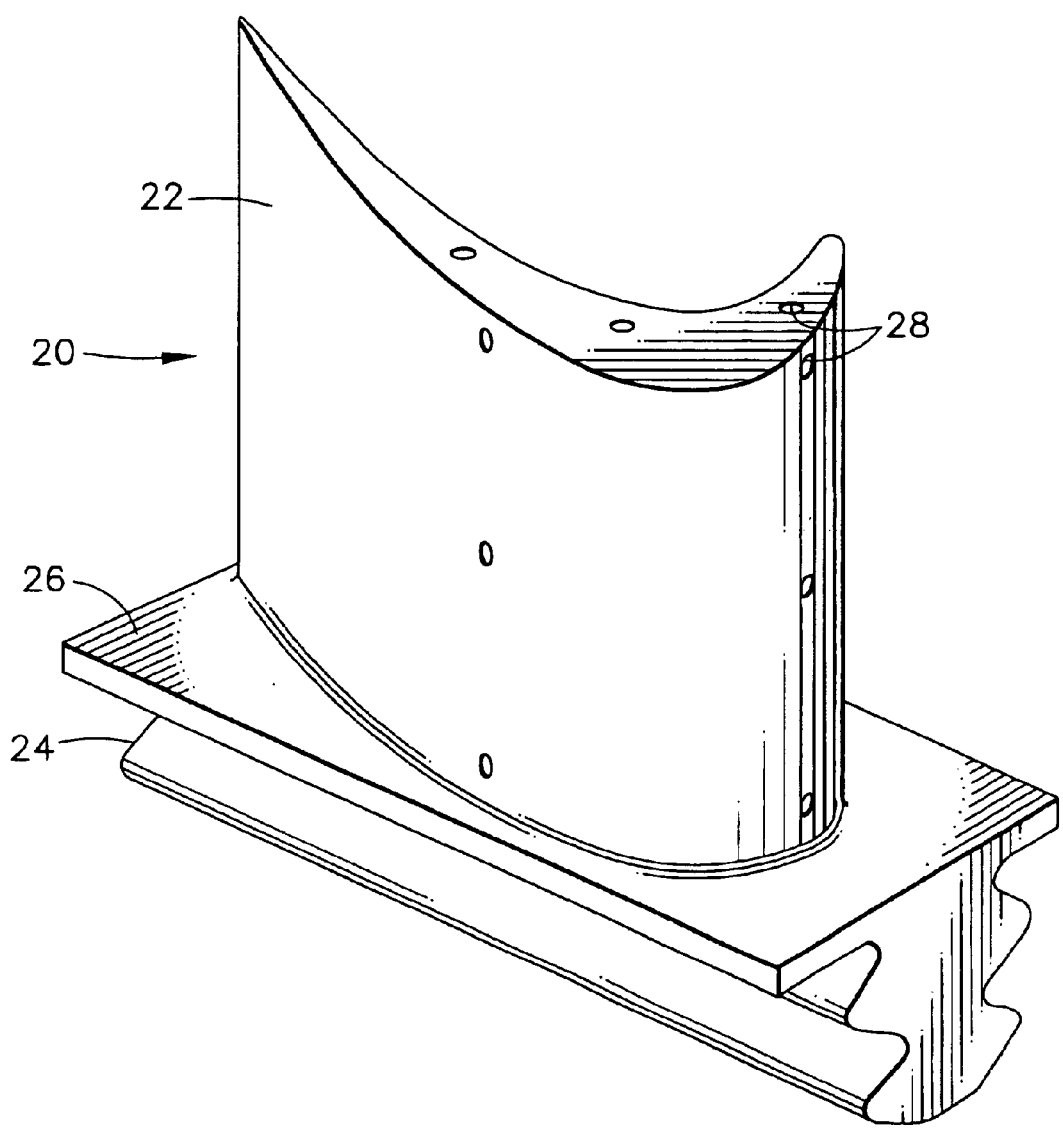
FIG. 1 is a perspective view of a gas turbine blade.

FIG. 1 depicts a component article of a gas turbine engine such as a turbine blade or turbine vane, and in this illustration a high pressure turbine (HPT) blade 20. The turbine blade 20 is formed of any operable material, but is preferably a nickel-base superalloy that is susceptible to the formation of secondary reaction zone (SRZ) when coated with an aluminum-containing protective coating by processes other than that described herein. The turbine blade 20 includes an airfoil section 22 against which the flow of hot exhaust gas is directed. (The turbine vane or nozzle has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. The interior of the airfoil 22 is typically hollow with connecting openings 28 in the surface of the airfoil 22. During service, a flow of cooling air is directed through the hollow interior and out the openings 28 to reduce the temperature of the airfoil 22. A rotating shroud may be found at the end of the airfoil 22 remote from the dovetail 24 in some versions of the turbine blade.

Figure 2:
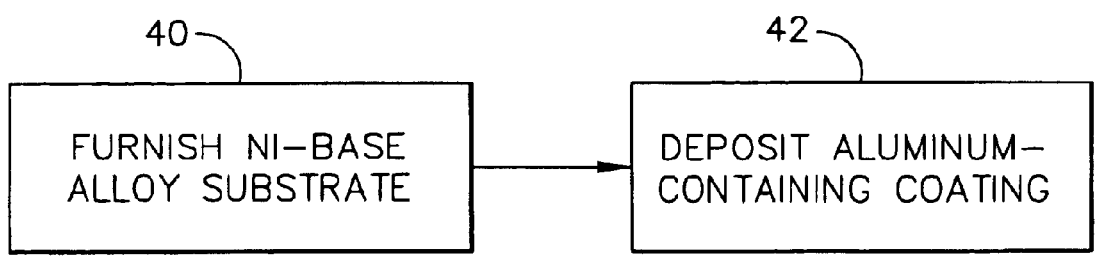
FIG. 2 is a block flow diagram of a preferred approach for practicing the invention.
Figure 3:
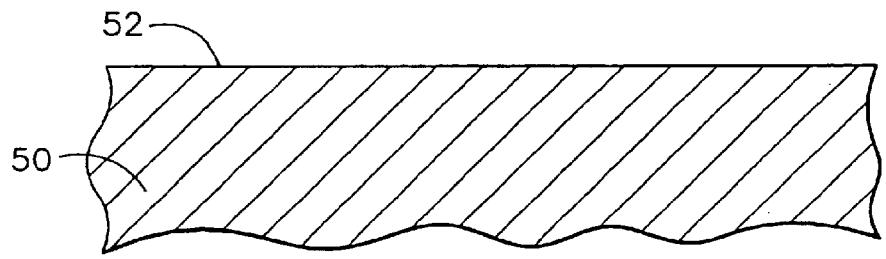
FIGS. 3–4 are schematic sectional views of the structure at various points in the processing of FIG. 2.

FIG. 2 depicts a preferred approach to preparing a coated superalloy article such as the turbine blade 20. A nickel-base superalloy article substrate having a rhenium content of not less than about 4.0 percent by weight is furnished, numeral 40. The article substrate preferably has the shape and dimensions of a component of a gas turbine engine such as the gas turbine blade 20 shown in FIG. 1. The article substrate is preferably a single crystal-article. The article substrate 50 having a surface 52 is shown in FIG. 3.

The article is made of a nickel-base superalloy with the indicated high rhenium content that is potentially subject to the formation of the deleterious SRZ if not properly coated. As used herein, "nickel-base" means that the composition has more nickel present than any other element. The nickel-base superalloys are typically of a composition that is strengthened by the precipitation of gamma-prime phase. The preferred nickel-base alloy is alloy René N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

The article substrate 50 is preferably furnished in a stress-relieved state. If the surface 52 of the article substrate 50 has been mechanically worked, it is desirably that the article substrate 50 and thence its surface 52 be stress relieved, as by heating to a stress-relieving temperature of from about 2050° F. to about 2150° F. for a stress-relieving time of from about 30 minutes to about 6 hours. The next step of depositing is thereafter performed without any intermediate cold working of the surface 52 of the article substrate 50. Even minor working, such as by grit blasting the surface to clean it, is to be avoided.

Figure 4:
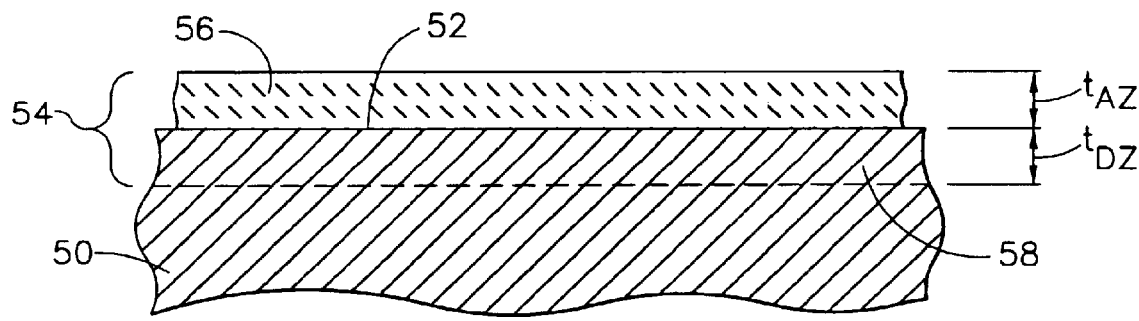

An aluminum-containing coating 54 is thereafter deposited onto the surface 52 of the article substrate 50, numeral 42 of FIG. 2, producing the structure shown in FIG. 4. The aluminum-containing coating 54 includes an additive zone 56 having an average aluminum content of not greater than about 27 percent by weight, preferably from about 22 to about 27 percent by weight, and a diffusion zone 58 of interdiffusion with the article substrate 50. A ratio of a thickness $t_{AZ}$ of the additive zone 56 to a thickness $t_{DZ}$ of the diffusion zone 58 is not greater than about 3:1, is preferably from about 0.75:1 to about 1.25:1, and is most preferably about 1:1. (The thicknesses of the additive zone 56 and the diffusion zone 58 may be determined from the etched metallographic microstructure. The surface 52 is marked by remnant oxides and other particles, so that its precise location may be visualized in a metallographic section.)

The aluminum-containing coating 54 is deposited at an elevated temperature by depositing pure aluminum or an aluminum-containing alloy onto the surface 52 of the article substrate 50. The aluminum deposition is accomplished by vapor phase aluminiding (VPA) or by chemical vapor deposition (CVD). The basic approach is disclosed, for example, in U.S. Pat. No. 6,332,926, whose disclosure is incorporated by reference. A finely divided mixture of aluminum metal, aluminum alloy, or aluminum-containing compound, together with a halide activator, preferably aluminum fluoride, is placed into a source chamber portion of a retort. Upon heating, the activator vaporizes to form a halide gas. The halide gas contacts the aluminum metal, aluminum alloy, or aluminum-containing compound to form the corresponding aluminum halide gas. Aluminide-modifying elements such as hafnium, zirconium, yttrium, silicon, titanium, tantalum, cobalt, chromium, platinum, palladium, and combinations thereof, may optionally be doped from similar sources into the gaseous source, or separately deposited by other techniques such as plating or physical vapor deposition. Although precious metals such as platinum and palladium may be present, it is preferred that they are not present in the aluminum-containing coating 54, because they tend to increase the activity of aluminum and thence the likelihood for formation of SRZ. In CVD, argon or hydrogen gas is flowed into the source chamber, providing a carrier for the aluminum-containing gas, while in VPA typically no carrier gas is used. The resulting source gas contacts the surface 52 of the article substrate 50, depositing aluminum or an aluminum-containing alloy thereon. The retort is usually heated to a deposition reaction temperature of from about 1925° F. to about 2000° F. during the deposition step 42 so that deposited aluminum atoms and modifier atoms interdiffuse into the article substrate 50 to form the diffusion zone 58. An aluminum-containing coating 54 about 0.002 inch thick may be deposited in about 4–8 hours using this approach. Optionally, the heating may be continued after the flow of aluminum-source gas is discontinued, to achieve further interdiffusion.

Other operable approaches for depositing the aluminum coating 54 may also be used. Examples include slurry-coating processes and above-the-pack aluminiding.

Figure 5:
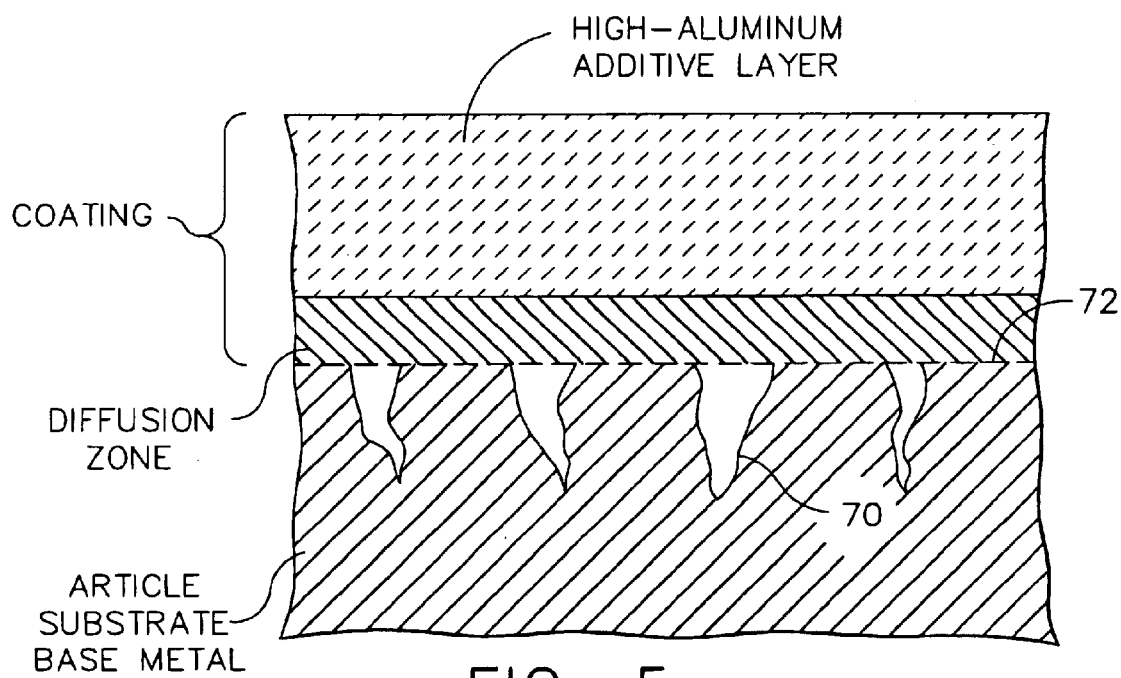
FIG. 5 is a schematic sectional view of a structure that is not within the scope of the invention.

The additive zone 56 may not have an average aluminum content of greater than about 27 percent by weight, and the ratio of the thickness $t_{AZ}$ of the additive zone 56 to the thickness $t_{DZ}$ of the diffusion zone may not be greater than about 3:1. If these limits are exceeded, there is a substantial risk of the formation of SRZ during subsequent heating of the article in processing or in service. The SRZ would otherwise form as an SRZ phase 70 by chemical reaction of aluminum from the coating and rhenium from the base metal of the article substrate. The SRZ phase 70 grows inwardly from a diffusion zone interface 72 and into the base metal of the article substrate as illustrated in FIG. 5, which depicts a structure that is not within the scope of the present invention. In this structure of FIG. 5, the additive zone has an aluminum content of more than about 27 weight percent, and the additive zone is relatively thick. As a result, the additive zone serves as a reservoir for aluminum, and a large amount of aluminum diffuses inwardly through the relatively thin diffusion zone to the diffusion zone interface 72, where the reaction with the rhenium occurs most strongly. By keeping the deposition temperature relatively high and the deposition of aluminum relatively slow in the present approach, the aluminum content of the additive layer 56 of FIG. 4 is relatively low, and the thickness of the diffusion zone 58 is relatively large as nickel diffuses rapidly through the diffusion zone 56 to the additive zone 58.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a coated superalloy article, comprising the steps of
   furnishing a nickel-base superalloy article substrate having a rhenium content of not less than about 4.0 percent by weight; thereafter
   depositing an aluminum-containing coating onto a surface of the article substrate, the aluminum-containing coating including
      an additive zone having an average aluminum content of not greater than about 27 percent by weight, and
      a diffusion zone of interdiffusion with the article substrate,
   wherein a ratio of a thickness of the additive zone to a thickness of the diffusion zone is not greater than about 3:1.

2. The method of claim 1, wherein the step of furnishing includes the steps of
   furnishing the nickel-base superalloy article made of the alloy Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

3. The method of claim 1, wherein the step of furnishing includes the step of
   stress relieving the article substrate, and the step of depositing is performed without any intermediate cold working of the surface of the article substrate.

4. The method of claim 1, wherein the step of furnishing includes the step of
   furnishing the nickel-base superalloy article substrate in the form of a component of a gas turbine engine.

5. The method of claim 1, wherein the step of furnishing includes the step of
   furnishing the nickel-base superalloy article substrate in the form of a gas turbine blade.

6. The method of claim 1, wherein the ratio of the thickness of the additive zone to the thickness of the diffusion zone is from about 0.75:1 to about 1.25:1.

7. The method of claim 1, wherein the step of depositing includes the step of
   depositing the aluminum-containing coating by a technique selected from the group consisting of vapor-phase aluminiding and chemical vapor deposition.

8. The method of claim 1, wherein the step of depositing includes the step of
   heating the article substrate to a temperature of from about 1925° F. to about 2000° F.

9. The method of claim 1, wherein the average aluminum content of the additive zone is from about 22 to about 27 percent by weight.

10. The method of claim 1, wherein the step of depositing the aluminum-containing coating includes the step of
    depositing the aluminum-containing coating having substantially no platinum-group element therein.

11. The method of claim 1, wherein the step of depositing the aluminum-containing coating includes the step of
    depositing the aluminum-containing coating such that the diffusion zone extends inwardly into the substrate from an original surface of the substrate.

12. A method for preparing a coated superalloy article, comprising the steps of
    furnishing a nickel-base superalloy article substrate having a rhenium content of not less than about 4.0 percent by weight; thereafter
    depositing an aluminum-containing coating onto a surface of the article substrate at a temperature of from about 1925° F. to about 2000° F., the aluminum-containing coating including an additive zone having an average aluminum content of not greater than about 27 percent by weight, and a diffusion zone of interdiffusion with the article substrate, wherein the aluminum-containing coating has substantially no platinum-group element therein.

13. The method of claim 12, wherein the step of furnishing includes the steps of furnishing the nickel-base superalloy article made of the alloy Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

14. The method of claim 12, wherein the step of furnishing includes the step of stress relieving the article substrate, and the step of depositing is performed without any intermediate cold working of the surface of the article substrate.

15. The method of claim 12, wherein the step of furnishing includes the step of furnishing the nickel-base superalloy article substrate in the form of a component of a gas turbine engine.

16. The method of claim 12, wherein the step of furnishing includes the step of furnishing the nickel-base superalloy article substrate in the form of a gas turbine blade.

17. The method of claim 12, wherein the step of depositing includes the step of depositing the aluminum-containing coating by a technique selected from the group consisting of vapor-phase aluminiding and chemical vapor deposition.

18. The method of claim 12, wherein the average aluminum content of the additive zone is from about 22 to about 27 percent by weight.

19. The method of claim 12, wherein the step of depositing the aluminum-containing coating includes the step of depositing the aluminum-containing coating wherein a ratio of a thickness of the additive zone to a thickness of the diffusion zone is not greater than about 3:1.

20. The method of claim 12, wherein the step of depositing the aluminum-containing coating includes the step of depositing the aluminum-containing coating such that the diffusion zone extends inwardly into the substrate from an original surface of the substrate.

21. A coated superalloy article comprising a nickel-base superalloy article substrate having a rhenium content of not less than about 4.0 percent by weight; and an aluminum-containing coating at a surface of the article substrate, the aluminum-containing coating including an additive zone having an average aluminum content of not greater than about 27 percent by weight, and a diffusion zone of interdiffusion with the article substrate, wherein a ratio of a thickness of the additive zone to a thickness of the diffusion zone is not greater than about 3:1.

22. The article of claim 21, wherein the nickel-base superalloy article is made of the alloy Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities.

23. The article of claim 21, wherein the article substrate is a component of a gas turbine engine.

24. The article of claim 21, wherein the article substrate is a gas turbine blade.

25. The article of claim 21, wherein the aluminum-containing coating has substantially no platinum-group element therein.

26. The article of claim 21, wherein the diffusion zone extends inwardly into the substrate from an original surface of the substrate.

* * * * *